United States Patent [19]

Sisk

[11] Patent Number: 5,207,411
[45] Date of Patent: May 4, 1993

[54] BUTTERFLY VALVE ASSEMBLY

[76] Inventor: David E. Sisk, Rte. 1, Box 246 E, Bonne Terre, Mo. 63628

[21] Appl. No.: 954,019

[22] Filed: Sep. 30, 1992

[51] Int. Cl.⁵ ............................................ F16K 1/22
[52] U.S. Cl. .................................. 251/306; 251/308; 251/358
[58] Field of Search ........................ 251/306, 308, 358

[56] References Cited

U.S. PATENT DOCUMENTS

| | | |
|---|---|---|
| 2,740,423 | 4/1956 | Stillwagon . |
| 2,912,218 | 11/1959 | Stillwagon . |
| 2,936,778 | 5/1960 | Stillwagon . |
| 2,994,342 | 8/1961 | Stillwagon . |
| 3,024,802 | 3/1962 | Stillwagon . |
| 3,043,557 | 7/1962 | Stillwagon . |
| 3,051,435 | 8/1962 | Ramsey . |
| 3,072,139 | 1/1963 | Mosites . |
| 3,100,500 | 8/1963 | Stillwagon . |
| 3,127,904 | 4/1964 | Stillwagon . |
| 3,129,920 | 4/1964 | Stillwagon . |
| 3,156,161 | 11/1964 | Forsman et al. . |
| 3,173,650 | 3/1965 | Cotterman et al. . |
| 3,233,861 | 2/1966 | Stillwagon . |
| 3,241,806 | 3/1966 | Snell, Jr. . |
| 3,253,815 | 5/1966 | Stillwagon . |
| 3,306,316 | 2/1967 | Stillwagon . |
| 3,314,641 | 4/1967 | Overbaugh . |
| 3,346,005 | 10/1967 | Hanssen . |
| 3,376,015 | 4/1968 | Forsman et al. . |
| 3,452,961 | 7/1969 | Forsman . |
| 3,537,683 | 11/1970 | Snell, Jr. . |
| 3,680,833 | 8/1972 | McNeely, Jr. . |
| 3,837,620 | 9/1974 | Malloy et al. . |
| 4,014,511 | 3/1977 | Uno . |
| 4,025,050 | 5/1977 | Manki et al. ...................... 251/306 |
| 4,026,514 | 5/1977 | Sumner et al. . |
| 4,065,979 | 1/1978 | Killian . |
| 4,079,746 | 3/1978 | Killian . |
| 4,141,537 | 2/1979 | Daghe . |
| 4,275,867 | 6/1981 | Schils . |
| 4,289,297 | 9/1981 | Nakanishi . |
| 4,399,833 | 8/1983 | Holtgraver . |
| 4,413,393 | 11/1983 | Schils . |
| 4,457,490 | 7/1984 | Scobie . |
| 4,465,260 | 8/1984 | Conley et al. . |
| 4,496,135 | 1/1985 | Scobie . |
| 4,541,612 | 9/1985 | Yohner . |
| 4,570,901 | 2/1986 | Holtgraver . |
| 4,685,611 | 8/1987 | Scobie et al. . |
| 4,699,357 | 10/1987 | Sisk . |
| 4,711,427 | 12/1987 | Holtgraner .......................... 251/308 |
| 4,751,938 | 6/1988 | Kerns et al. . |
| 4,773,625 | 9/1988 | Calvin . |
| 4,822,001 | 4/1989 | Sisk . |

Primary Examiner—John C. Fox
Attorney, Agent, or Firm—Paul M. Denk

[57] ABSTRACT

An industrial butterfly valve for use in a fluid flow line is provided having a tubular housing with a disc valve and stem mounted for pivotal movement within the flow passage found in the housing. The assembly employs a unique bolt retention component that functions to prevent back out of the bolts holding the disc to the stem and further functions to prevent leakage around the bolts. A resilient seat around the interior periphery of the flow passage provides a positive seal when the disc is rotated to a closed position the resilient seat having a pair of annular bias springs molded into the mounting edges so as to retain its shape and resist peeling or distortion upon assembly and disassembly in a flow line.

15 Claims, 2 Drawing Sheets

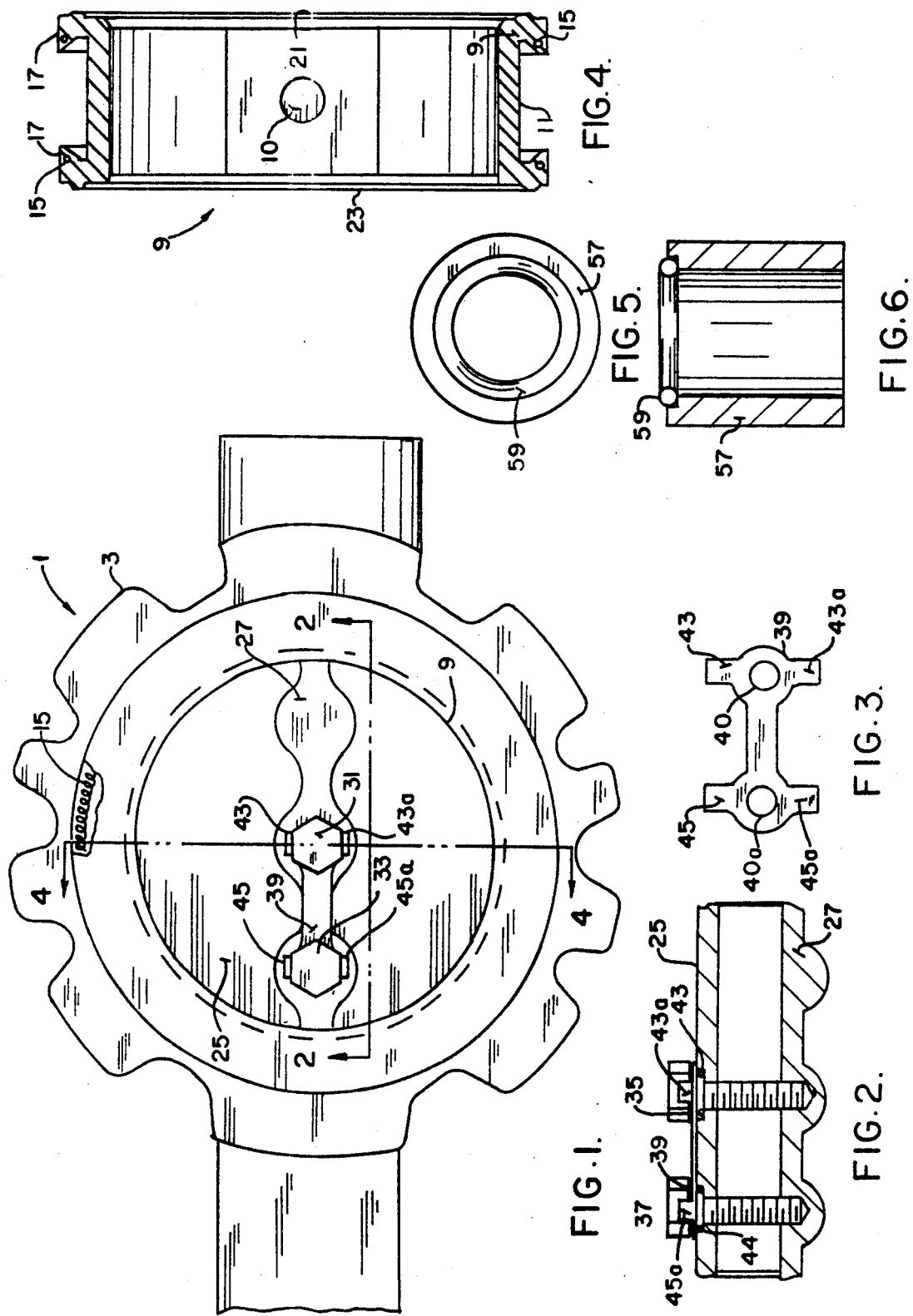

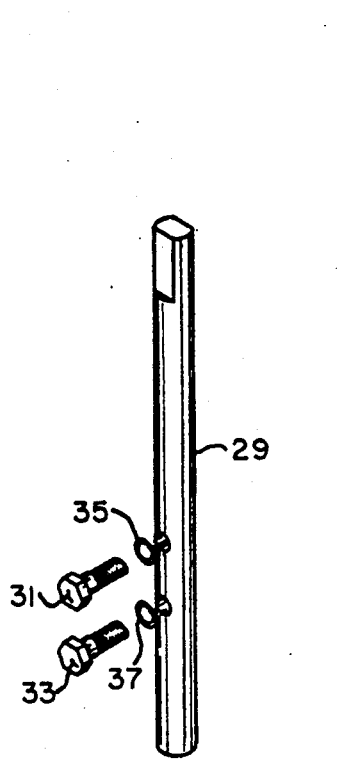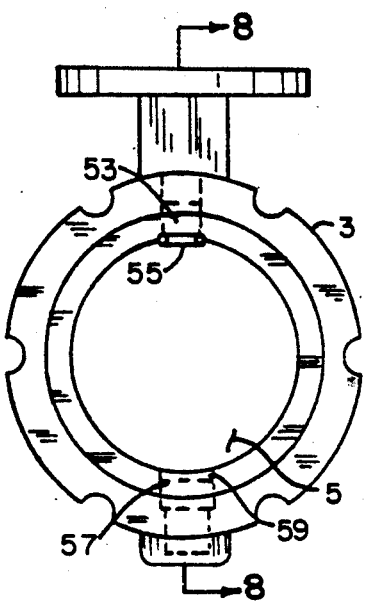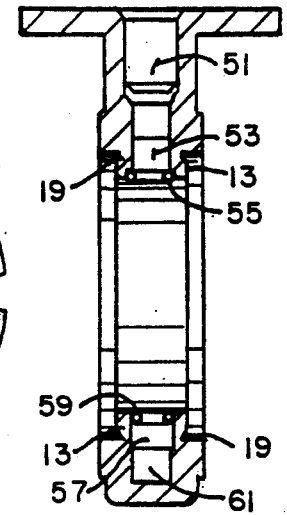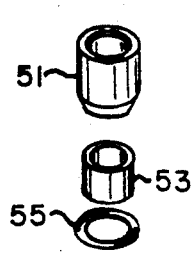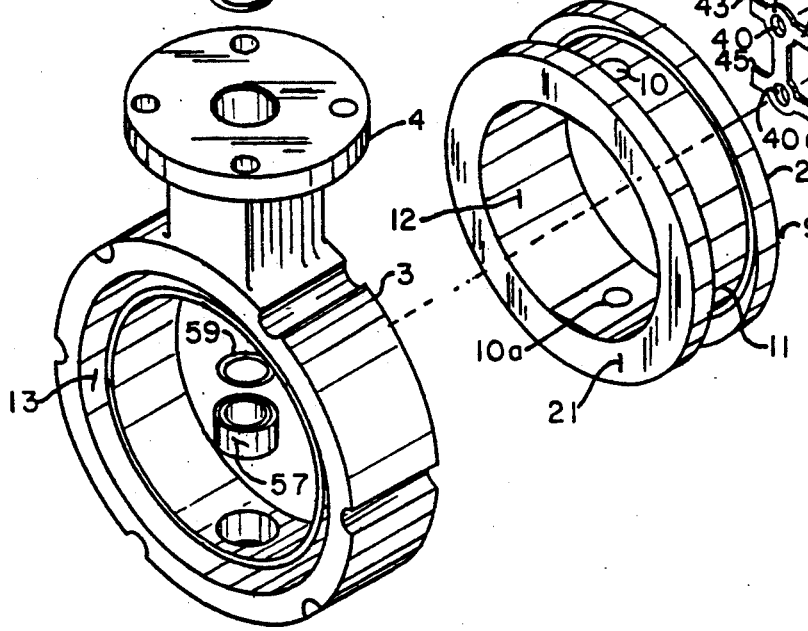

BUTTERFLY VALVE ASSEMBLY

BACKGROUND OF THE INVENTION

This invention relates generally to a valve means for application within a flow line, more particularly to a reinforced pivotal butterfly valve for industrial application which incorporates bushings to enhance the useful life of the movable parts such as the valve stem. The assembly employs a unique shape-retention mechanism so that the internal resilient seat maintains its shape and resiliency upon assembly and disassembly. The invention includes a unique bolt retention mechanism for locking the stem bolts to the disc valve to prevent the bolts from loosening and backing out thereby causing valve failure. The bolt retention component also serves to keep the bolt from cutting into the "O"-ring seals and thereby prevents seal damage and leaking around the bolt.

Butterfly or disc valves are frequently used in fluid flow lines where it is desired to load or unload fluid materials for shipment or storage. Such uses include tank trailers for transporting fluids (liquid or granular material) from one location to another, as well as fluid flow lines for loading and unloading barges, ships or other means of transportation and storage. Other uses include blowers, dust collectors, and other such devices using flow lines where some control is required.

Butterfly or disc valves are well-known to the art. U.S. Pat. No. 2,740,423 to Stillwagon discloses a disc valve, particularly, a butterfly or valve, designed for use in the low pressure ranges up to approximately 150 p.s.i. or higher. U.S. Pat. No. 2,912,218 to Stillwagon discloses a butterfly valve having a resilient valve seat which seals between two parts of the valve body. U.S. Pat. No. 2,936,778 to Stillwagon shows a butterfly valve for use in a flow line and having a valve that is quickly and easily removable from the assembly for cleaning and repairing.

U.S. Pat. No. 2,994,342 to Stillwagon describes a improvement to the valve shown in his U.S. Pat. No. 2,740,423. U.S. Pat. No. 3,024,802 to Stillwagon also describes a valve and more particularly a butterfly valve and is also improvement of the valves shown in his U.S. Pat. No. 2,912,218.

U.S. Pat. No. 3,043,557 to Stillwagon relates to improvements in butterfly or disc valves and more particularly to improvements in the seating and sealing mechanism between the disc and a resilient seat. U.S. Pat. No. 3,051,435 to Ramsey describes an improvement in butterfly or disc valves adapted for use in pressure ranges up to approximately 150 p.s.i. and even higher.

U.S. Pat. No. 3,024,802 to Stillwagon describes an improvement in his prior disc valve inventions.

U.S. Pat. No. 3,314,641 to Overbaugh describes a butterfly valve with an improved resilient seat member having a rigid reinforcement therein. U.S. Pat. No. 3,127,904 to Stillwagon describes an improvement in butterfly or disc valves used in food processing and the manufacturing of explosives.

U.S. Pat. No. 3,129,920 to Stillwagon describes improvements in conduit connections and more particularly in such connections having disc or butterfly valves therein.

U.S. Pat. No. 3,241,806 to Snell describes a disc valve having a plastic layer or resilient seating surface. U.S. Pat. No. 3,253,815 to Stillwagon describes improved disc valves and disc valve seats adapted for installation between "slip-on" flanges in the pipe line where the flanges extend beyond the ends of the pipes to which they are connected. U.S. Pat. No. 3,233,861 to Stillwagon describes a butterfly valve having a reinforced seat structure.

U.S. Pat. No. 3,306,316 to Stillwagon describes a disc valve and fitting adapted to be connected in a pipe line or system and occupy a space greater than that occupied normally by a disc valve, such as the space normally occupied by a gate or plug valve without the necessity of using extra fittings or adapters to take up the excess space.

U.S. Pat. No. 3,376,015 to Foresman discloses a high pressure butterfly valve. U.S. Pat. No. 3,452,961 to Foresman describes a valve operator for rotating a disc valve through 90 degrees from a closed position to a fully opened position. U.S. Pat. No. 3,537,683 to Snell describes a valve seat for use within a butterfly valve and also the method for making the valve seat.

U.S. Pat. No. 3,680,833 to McNeely, Jr. describes a butterfly-type valve having a pair of symetrically disposed veins with peripheral edges that lie in a non-coincident plain.

U.S. Pat. No. 4,079,746 to Killian describes a valve assembly for securing between two flange fittings and an adapter to be used with a valve body having no bolt-receiving holes therein. U.S. Pat. No. 4,275,867 to Schils discloses a disc type valve having a minimal number of rotating parts acting as one integral piece. U.S. Pat. No. 4,399,833 to Holtgraver shows a wafer-type valve for securing between to flange fittings and an adapter device for adapting the valve body to various types of flange fittings in a pipe line. U.S. Pat. No. 4,413,393 Schils discloses a disc type valve assembly in a method of making the same. U.S. Pat. No. 4,457,490 to Scobie provides an improved seat or seal for a butterfly valve. U.S. Pat. No. 4,570,901 to Holtgraver, shows a positioning assembly for rotatable valve, more particularly, an assembly for rotating and positioning the valve element of a rotatable valve. U.S. Pat. No. 4,685,611 to Scobie shows a butterfly valve having a compound, composite, reinforced seat, with the valve having a one piece body.

My U.S. Pat. No. 4,822,001, provides a butterfly valve for insertion between a pair of spaced flanges and fluid flow passageway particularly a resilient seal for use with the butterfly valves which is constructed configured relative to the butterfly valve to provide positive line contact sealing with the adjoining pipe flanges; the disclosure of U.S. Pat. No. 4,822,001 is hereby incorporated by reference. Furthermore my U.S. Pat. No. 4,699,357 describes a reinforced industrial butterfly valve incorporating resilient seal around the interior peripheral wall of the flow passage providing a positive seal during pressure or vacuum service of the valve, and incorporating bushings around the extending proximate end of the valve stem to prevent ware and improve operation.

There are numerous problems associated with the butterfly valves of the prior art. For example, bolts are used to attach the disc to the valve stem and the bolts have a tendency to cut into the disc or "O"-ring seals around the bolt when tightening thereby allowing leakage. Material can flow through the damaged seals, by the bolts, up and down the shaft, and out of the top of the valve causing product loss or contamination. Furthermore, the bolts that hold the disc to the shaft often back out so that play develops between the disc and the shaft when the shaft has rotational pressure put on it. The loose bolts will eventually shear allowing the shaft to turn in the disc and causing valve failure.

Prior art valves have another problem in that the product can leak around the disc when the valve seat wears around the top and the bottom stem holes. This material flows around the worn valve seat at the top and bottom stem hole and the housing area, and the stem seats causing the stem to seize and the valve to fail.

Furthermore, when removing a valve out of rigid pipeline the installer has to force the resilient valve seat between the flow line pipe flanges. The valve seat, generally having a sealing bead on it, can snag on the flange causing the valve seat to pull out of the housing or peel thereby causing the seat to distort, if not tear, and the valve to leak or fail. Moreover, the prior art seats are designed to fit within a dove tail or keystone area of the valve housing. Under the pressure of use, corresponding angled areas of the resilient seat are often compressed into the dove tail or keystone of the housing causing material to be pressed into the angle areas and captured there. This material retained in the dove tail area can result in product contamination from load to load.

SUMMARY OF THE INVENTION

It is therefore an object of the invention to provide a butterfly valve having a resilient valve seat member having means to retain its shape and fit properly within the housing area so as not to distort upon insertion or removal or compress during use thereby eliminating any problem with seat failure or retention of contaminating material load to load.

It is a further object of the invention to provide a means for attaching a bolt through the shaft to the disc so that the bolts will not cut into sealing "O"-rings causing leakage into the disc and into the valve housing.

It is a further object of the invention to provide a means for securing the bolts through the valve stem into the disc that prevents bolt back off and prevents shearing of the bolt heads under pressure.

It is a still further object of the invention to provide a design for preventing wear of the resilient seat around the shaft as the shaft rotates within the resilient seat thereby preventing leakage of product from around the stem and disc.

Briefly stated, a butterfly valve for insertion between a pair of spaced flanges in a fluid flow passageway is described incorporating a tubular valve body having a pivotally mounted disc valve positioned in the fluid flow passageway for rotation between an opened and closed position and a resilient seat mounted within the tubular body having an inner wall for engaging the disc along its outer peripheral edge when the disc valve closes the fluid passageway. The seat has spaced and opposed outer walls which complimentary engage a dove tail or keystone extension projecting from within the tubular body, the spaced and opposed outer walls of the resilient seal having a biasing means formed therein so as to engage the dove tail extension to prevent leakage around the dove tail, to prevent compression of the resilient seal within the dove tail extension, and to prevent deformation and leakage of the resilient seal when the valve assembly is installed or removed.

The valve disc is secured to the stem with bolts, the bolts being sealed against the disc with "O"-rings. The bolts also employ a locking means whereby the bolt head is locked into place to prevent back out and bolt head sheer. The locking means also provides barrier between the bolts and "O"-rings to prevent the bolt from cutting into the "O"-ring and causing seal failure and leakage when the bolt is tightened.

The valve stem is seated in bushings set in counterbores in the tubular body, the bushings each having "O"-ring seals thereon to prevent excessive ware and to prevent leakage around the valve stem and disc, and further to prevent material from wedging therein.

BRIEF DESCRIPTION OF THE DRAWINGS:

FIG. 1 is a top plan of the butterfly valve of the present invention.

FIG. 2 is a sectional view of the disc and stem components of the butterfly valve of the present invention taken across line 2—2 of FIG. 1.

FIG. 3 is a top plan of the bolt retention component of the butterfly valve of the present invention.

FIG. 4 is a sectional view of the resilient seat component taken along line 4—4 of FIG. 1.

FIG. 5 is a top plan of the lower bushing and "O"-ring assembly.

FIG. 6 is a sectional view of the lower bushing and "O"-ring assembly.

FIG. 7 is a front view of the tubular housing of the valve assembly of the present invention.

FIG. 8 is a sectional view taken along line 8—8 of FIG. 7.

FIG. 9 is a top plan of the support spring.

FIG. 10 is an exploded view of the butterfly valve of the present invention.

DESCRIPTION OF A PREFERRED EMBODIMENT

Referring now to the drawings the butterfly valve assembly of the present invention is shown generally at 1. Assembly 1 incorporates tubular housing 3 having an upper projecting boss 4 (FIG. 10) to provide support for the mounting of operating components of the valve, for example, a lever (not shown) or other manual or automatic means for opening and closing the valve.

Tubular housing 3 has a flow passage 5 formed therethrough (FIG. 7) to accommodate the flow of various types of materials when the valve is in an opened position. Tubular housing 3 may be inserted within any form of a flow line and may be used with unloading or conveyancing of material whether the material be granular or liquid. The invention may be incorporated within aeration devices, blowers, dust collectors, and any other flow line in which some control is required.

As can be seen in FIG. 1 and FIG. 4, there is a resilient seat 9 around the internal perimeter of flow passage 5. Seat 9 may be formed of any type of highly abrasive resistant compound such as rubber or polymer. Seat 9 is held in position through its pre-molding to incorporate an external groove 11 that cooperatively mates onto the keystone 13 formed with an inner peripheral of housing 3. Furthermore, resilient seat 9 has a bias spring 15 formed within opposing retention angles 17. Angles 17 are designed to engage angles 19 of Keystone 13 (see FIG. 8). Spring 15 (FIG. 9) is formed from stainless steal or other appropriate material so as to be collapsible yet resilient allowing it to return to its original shape following folding for insertion.

During installation, Seat 9 can be compressed or folded and inserted into housing 3 and secured within keystone 13 as stated above. Spring 15 allows angles 17 to maintain their shape and remain securely trapped in angles 19 of keystone 13. When the assembly is installed within a flow line or forcably removed from a flow line, spring 15 serves to keep seal 9 from distorting or peeling out of position.

Furthermore, biasing spring 15 keeps seat angles 17 from compressing under the force of material flow. As previously explained, prior art valve seats can compress and hold material in angles 17 and 19 and thus cause cross-contamination load to load. The unique design of angles 17 with springs 15 therein eliminate such compression.

Seat 9 has flat outer surfaces 21 and 23 constructed to form a flush seal against the flanges of the contiguous and adjacent material flow line pipes (not shown) the when assembly is installed in a flow pipe. Furthermore, resilient seat 9 has internal face 12 which serves to seat the edges of the disc component of butterfly valve when the disc component is moved or rotated to a close position as will be further explained below. Seat 9 has opposing holes 10 and 10A formed therein so as to allow the valve stem 29 to be inserted therethrough.

The valve means of the assembly includes disc valve 25 which is preferably formed as a stainless steal disc precision machine for providing a positive seal against the internal face 12 of resilient seat 9 when disc 25 is rotated to a close position. The perimeter edges of disc 25 are contoured so as to lower the operating torque necessary to effect its pivot. Also, by contouring the edges of disc 25, maximum material flow is permitted past the disc when disc 25 is rotated to a fully opened position.

Disc 25 is formed having an enlarged central portion 27 arranged approximately diametrically of the disc 2 and through which is provided a channel (not shown) into which stem 29 tightly inserts. Stem 29 is secured into the disc by the use of fasteners such as the pair of hex bolts shown as 31 and 33. To prevent leakage of material around bolts 31 and 33 when disc 25 is rotated to a close position, seals or "O"-rings 35 and 37 are placed around the head of the bolt. As explained above, in prior art valves, during tightening of the bolts can cut into or distort the "O"-rings and allow material to leak pass the head of the bolt. To prevent that problem the assembly of the present invention employs a novel bolt retention component 39 between "O"-rings 35 and 37 and a second set of seals or "O"-rings 41 and 43. When bolts 31 and 33, passing through holes 40 and 41 formed in retention component 39, are tightened down, retention component 39 applies an even pressure to seals 43 and 44 as well as the backside of seals 35 and 37 to keep the seals from distorting or cutting and thereby preserving the integrity of the seals and preventing material from leaking around the bolts.

Retention component 39 also solves another problem found in the prior art. Repeated use of the valve assembly, notably rotation of stem 29 often causes the fasteners, such as bolts 31 and 33, to loosen and back out of disc 25 resulting in leakage of material around the bolts and also causing the bolt heads to shear off with corresponding valve failure. As best illustrated in FIG. 1–3, retention component 39 has two pairs of opposing wings, 43, 43a, and 45, 45a, which are bent upward against a flat side of a hex bolt 31 and 33 to hold the bolts in place and prevent the bolts from turning or loosening in use.

Turning now to the operation of disc 25 within housing 3 which is best illustrated in FIGS. 7–10, housing 3 contains a first upper bushing 51 seated therein and a second upper bushing 53 with a seal or "O"-ring 55 seated on the lower end. This bushing assembly has several functions; first, the bushings allow the stem 29 to rotate freely within housing 3, and secondly "O"-ring 53 provides an additional seal to prevent leakage around the stem. Furthermore, "O"-ring 55 is positioned between the peripheral edge of disc 25 and internal face 12 of resilient seat 9 to prevent excessive ware to the internal face 12 of the resilient seat.

Lower bushing 57 with a seal or "O"-ring 59 seated thereon (FIG. 5–6) serves to allow stem 29 to smoothly rotate within housing 3 and prevent premature ware of resilient seat.9 as described above. "O"-ring 59 prevents leakage around the stem as well as providing a barrier between face 12 of resilient seat 9 and the peripheral edge of disc 25.

Counterbore 61 (FIG. 8) provides a seat for the distal end of stem 29 so that stem 29 can be inserted through housing 3, through holes 10 and 10A in resilient seat 9 and through disc 25 into counterbore 61 thereby providing a pivot for the disc within the housing.

Variations or modifications of the subject matter of this invention may occur those skilled in the art upon reviewing the invention as described herein. Such variations or modifications, if within the spirit of this invention, are intended to be encompassed within the scope of any claims to patent protection issuing upon this development. The description of the preferred embodiment set forth herein is done so principally for illustrated purposes only.

Having thus described the invention, what is claimed and desired to be secured by Letters Patent is:

1. A butterfly valve for insertion between a pair of spaced flanges in a fluid passageway wherein said valve attains flush alignment with said flanges to maintain continuity and uninterrupted flow of material therethrough, said valve including a tubular body having a fluid flow chamber therethrough for communication with the fluid flow passage;

said valve including a disc element pivotally mounted within said tubular body to open and close the fluid flow chamber in said tubular body for open and closed communication with the fluid flow passageway;

a resilient seat surrounding the fluid flow chamber of said tubular body and including an inner wall having integrally connected spaced and opposed outer walls, the inner wall of said resilient seat being configured and dimension to engage and seal the disc element along its outer periphery when the disc element closes the fluid flow chamber in said tubular body;

said spaced and opposed outer wall of said resilient seat having inner surface walls directed towards each other and disposed for complimentary engagement and retention by a dove tail extension projecting from an inner portion of said tubular body, said dove tail extension forming entrant angles for reception of said inner wall surfaces of the seat; and said inner surface walls of the opposed outer walls of said resilient seat having biasing means formed therein to prevent distortion of said resilient seat upon assembly or disassembly of said valve assembly, said biasing means also disposed so as to prevent compression of said inner surface walls preventing accumulation of any material within said compressions.

2. The valve as defined in claim 1 wherein during installation the resilient seat can be compressed against said biasing means and inserted within said tubular body and wherein said biasing means will expand to allow seating of said inner surface walls within said dove tail extension.

3. The valve of claim 1 wherein said biasing means is a stainless steel spring.

4. The valve as defined by claim 1 wherein said resilient seat has a first and second outer surfaces, said first and second outer surfaces being flat.

5. The valve as defined in claim 1 wherein said tubular housing has counterbores formed therein, said counterbores disposed to seat bushings, said bushings disposed so as to accept a valve stem inserted therethrough.

6. The valve as defined by claim 5 wherein said bushings further comprise "O"-rings mounted thereon, said "O"-rings positioned so as to prevent wear of the resilient seat by rotation of the valve stem therein.

7. The valve of claim 1 wherein said disc valve is mounted to said valve stem by a pair of bolts.

8. The valve of claim 7 wherein said bolts are secured in place by a bolt retention means.

9. The valve of claim 8 wherein said bolt retention means further provides a barrier to prevent said bolts from cutting into a seal upon tightening.

10. The invention in claim 9 wherein said bolt retention means further comprises two sets of opposed wings, each set of wings designed to fold up and around a bolt head thereby preventing said bolt head from turning and backing out of said disc.

11. In an industrial butterfly valve of a type including a disc valve pivotally mounted within a tubular housing and through which material flows, said tubular housing having a flow chamber provided at approximately centrally therethrough, said butterfly valve being located within a material flow line, said flow line having a passage therethrough and through which material flows as it also passes through the flow chamber of the tubular housing;
said butterfly valve incorporating a pivot stem supporting said disc valve for its pivotal movement between the open and close positions, said pivot stem being attached to said disc valve by a plurality of bolts and seals; and
said bolts further comprising a bolt retention means said bolt retention means forming a barrier to prevent said bolt from cutting into said seals when tightening, said bolt retention means further comprising means for securing said bolts to prevent rotation of said bolt within said disc so as to prevent said bolts from rotating and backing out of said disc.

12. The valve of claim 11 wherein said tubular housing has bushings therein, said bushings having "O"-rings mounted thereon said bushings and "O"-rings disposed to allow insertion of said valve stem, said bushings and said "O"-rings designed to prevent wear when said valve stem is rotated within said housing.

13. In an industrial butterfly valve of the type including a disc valve pivotally mounted within a tubular housing, through which a material flows, said tubular housing having a flow chamber provided approximately centrally therethrough, said disc valve being located within said flow chamber;
said butterfly valve incorporating a pivot stem supporting said disc valve for its pivotal movement between the open and close positions, said pivot stem being mounted to said disc valve through a bolt retention means, said bolt retention means having wings formed thereon, and positioned so as to secure said bolt and prevent retrograde rotation of said bolt within said disc valve;
each said bolts being inserted through "O"-rings, so as to prevent leakage around said bolt; said bolt retention means also serving as a barrier to prevent said bolt from cutting into said "O"-rings when said bolt is tightened into said disc valve;
pivot mounts in the form of appatures arranged diametrically of and within said tubular housing for mounting for pivotal movement of said stem and disc valve, said stem extending from opposite edges of the disc valve and pivotally mounted to said housing, within its appatures;
bushings provided around said stem and upon its extension from said disc valve for pivotal movement within said tubular housing, said bushings having "O"-rings formed thereon so as to prevent any leakage around said stem and said bushings;
said housing appatures being counterbored, said bushings and said "O"-rings tightly fitting within said counterbored to facilitate the pivot of the disc valve and its stem within said tubular housing between its open and material flowing position to its closed position, said housing appatures communicating with said flow chamber, one of said counterbores opening internally from said tubular housing and being in open communication with said flow chamber, the other of said counter boards opening exteriorally in said housing;
each bushing and "O"-ring comprising an annulus formed of a polymer and provided for reducing the friction between the stem during its pivotal movement while also being corrosion resistant;
a resilient seat surrounding said flow chamber and cooperating and in alignment with said disc valve when arranged in its closed position to seal off said flow chamber against passage of any material therethrough, said resilient seat including an inner wall integrally connected to spaced and opposed outer walls, the inner wall of said resilient seal being configured in dimension to engage and seal the disc element along its outer peripheral when the disc element closes the fluid flow chamber in said tubular body, said spaced and opposed outer walls of said resilient seat having inner wall surfaces directed toward each other and disposed for complimentary engagement and retention by a dove tail extension projecting from an inner portion of said tubular body, said dove tail extension forming reentrant angles for reception of said inner wall surface of the seal;
said inner wall surfaces of the opposed outer walls of said resilient seal also each containing a bias spring disposed so as to allow said inner wall surfaces of said resilient seat to engage said inner wall surfaces of said dove tail extension thereby preventing said inner wall surfaces of said resilient seat from compressing and capturing material flowing therethrough and contaminating said valve assembly, said springs also disposed so as to allow folding of said seat for insertion within said tubular body upon assembly, said springs further functioning to hold said resilient seat in place upon insertion or removal of said valve assembly in a material flow line; and said resilient seat further having spaced and opposed outer walls, each said outer wall surface extend beyond the tubular body of said valve for engagement of said one spaced pair of flanges, upon installation.

14. The valve of claim 13 wherein said bias spring is made of stainless steel.

15. The valve of claim 13, wherein said resilient seat having a pair of sides, each side being flat, whereby upon tightening of the tubular housing and its supported resilient seat within the material flow line said flat wall furnishing a tighter fit within said flow line.

* * * * *